(12) United States Patent
Oba et al.

(10) Patent No.: US 9,118,827 B2
(45) Date of Patent: Aug. 25, 2015

(54) CAMERA DEVICE, CAMERA SYSTEM AND CAMERA CONTROL METHOD

(75) Inventors: Eiji Oba, Tokyo (JP); Noboru Katsui, Tokyo (JP); Hiroyasu Nakano, Saitama (JP); Satoshi Tagami, Kanagawa (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 13/215,794

(22) Filed: Aug. 23, 2011

(65) Prior Publication Data

US 2012/0050550 A1    Mar. 1, 2012

(30) Foreign Application Priority Data

Aug. 27, 2010  (JP) ................ P2010-191377

(51) Int. Cl.
H04N 5/232    (2006.01)
(52) U.S. Cl.
CPC ................ *H04N 5/23203* (2013.01)
(58) Field of Classification Search
CPC .......... H04N 5/23203; H04N 5/23206; H04N 5/23241
USPC ................. 348/211.1, 211.3, 211.8
See application file for complete search history.

(56) References Cited

U.S. PATENT DOCUMENTS

| | | | |
|---|---|---|---|
| 3,916,436 A * | 10/1975 | Marey et al. ............... | 348/211.5 |
| 5,821,995 A * | 10/1998 | Nisikawa ................... | 348/211.5 |
| 6,191,814 B1 * | 2/2001 | Elberbaum .............. | 348/211.14 |
| 6,392,698 B1 * | 5/2002 | Yokoyama ................. | 348/222.1 |
| 7,830,220 B2 * | 11/2010 | Ceylan et al. ................. | 332/145 |
| 2003/0076422 A1 * | 4/2003 | Ito et al. ..................... | 348/211.5 |

FOREIGN PATENT DOCUMENTS

| | | | |
|---|---|---|---|
| JP | H05-103032 | A | 4/1993 |
| JP | 2000-032359 | A | 1/2000 |
| JP | 2000-184363 | | 6/2000 |
| JP | 2000-184363 | A | 6/2000 |
| JP | 2005-318045 | A | 11/2005 |
| JP | 2007-124227 | A | 5/2007 |
| JP | 2010-011341 | A | 1/2010 |

* cited by examiner

Primary Examiner — Timothy J Henn
(74) Attorney, Agent, or Firm — Sony Corporation

(57) ABSTRACT

A camera device includes: an imaging unit taking image light to obtain a video signal; an output unit outputting the video signal obtained in the imaging unit to a connected cable; a detection unit detecting current variation or voltage variation of the video signal to be outputted from the output unit; and a control unit determining a control signal transmitted through the cable based on the signal variation detected by the detection unit and performing operation control corresponding to the determined control signal.

20 Claims, 16 Drawing Sheets

ENTIRE CONFIGURATION EXAMPLE (MODIFICATION EXAMPLE 2)

ENTIRE CONFIGURATION EXAMPLE

FIG.2 CIRCUIT CONFIGURATION EXAMPLE

DETECTION CONFIGURATION EXAMPLE

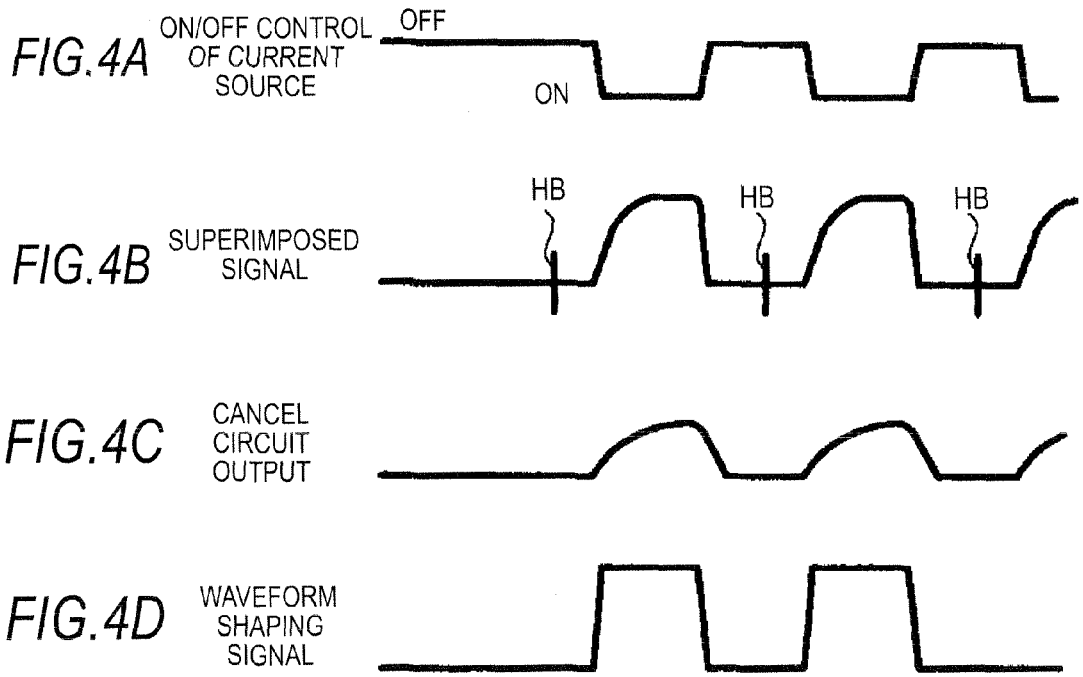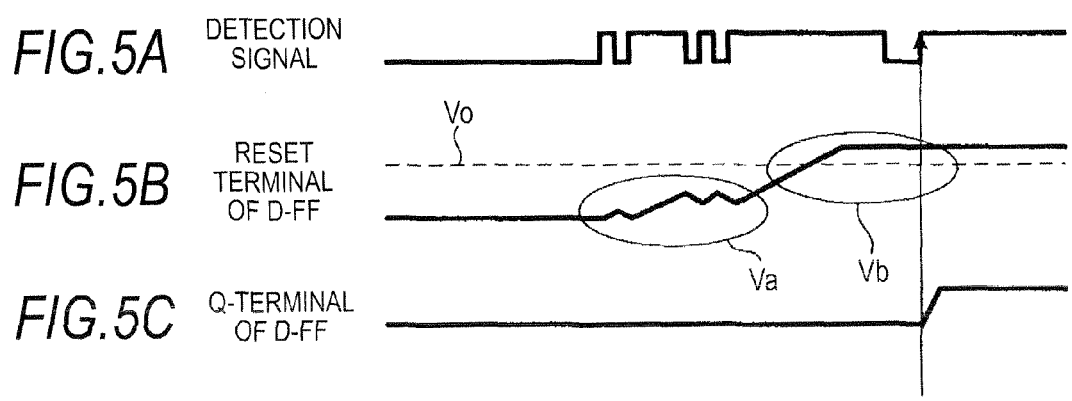

TRANSMISSION PROCESSING EXAMPLE OF CONTROL SIGNAL

FIG.9 ENTIRE CONFIGURATION EXAMPLE (MODIFICATION EXAMPLE 2)

VOLTAGE SIGNAL TRANSMISSION EXAMPLE

APPLICATION EXAMPLE OF VOLTAGE SIGNAL
FIG. 12A  VIDEO SIGNAL
FIG. 12B  SUPERIMPOSED SIGNAL
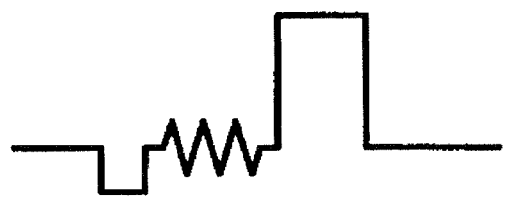
FIG. 12C  DC SIGNAL
EXAMPLES OF VOLTAGE APPLICATION STATES
FIG. 13A  APPLICATION VOLTAGE
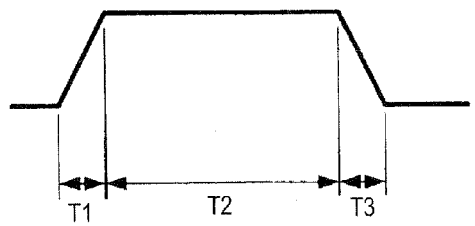
FIG. 13B  VOLTAGES OF RESPECTIVE UNITS
b-1
VIDEO SIGNAL LINE
b-2
INPUT OF COMPARATOR 164
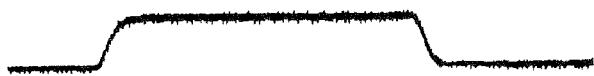
b-3
OUTPUT OF COMPARATOR 164

FIG.14

EXAMPLE IN RESPECTIVE BUTTON OPERATIONS

|  |  | RISING | FIXED | FALLING |
|---|---|---|---|---|
| A-BUTTON | DUTY | 0%-80% | 80% | 80%-0% |
|  | TIME | 100ms | 200ms | 100ms |
| B-BUTTON | DUTY | 0%-80% | 80% | 80%-0% |
|  | TIME | 100ms | 400ms | 100ms |
| A+B BUTTONS | DUTY | 0%-80% | 80% | 80%-0% |
|  | TIME | 100ms | 800ms | 100ms |

FIG. 16
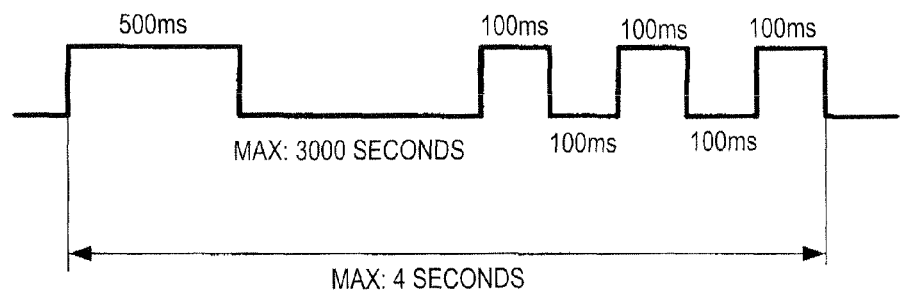
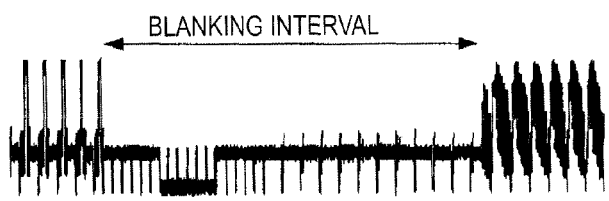
FIG. 17A VIDEO SIGNAL WAVEFORM
FIG. 17B CONTROL PULSE
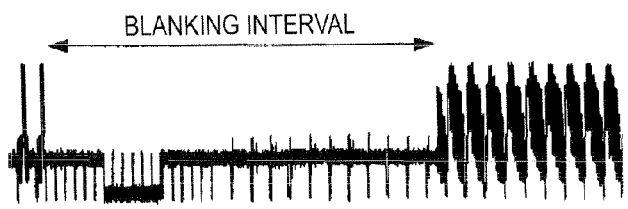
FIG. 18A VIDEO SIGNAL WAVEFORM
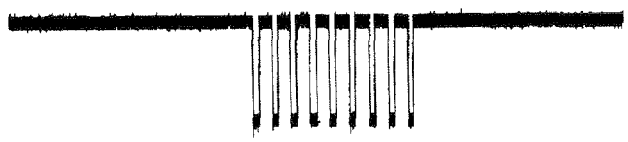
FIG. 18B CONTROL PULSE

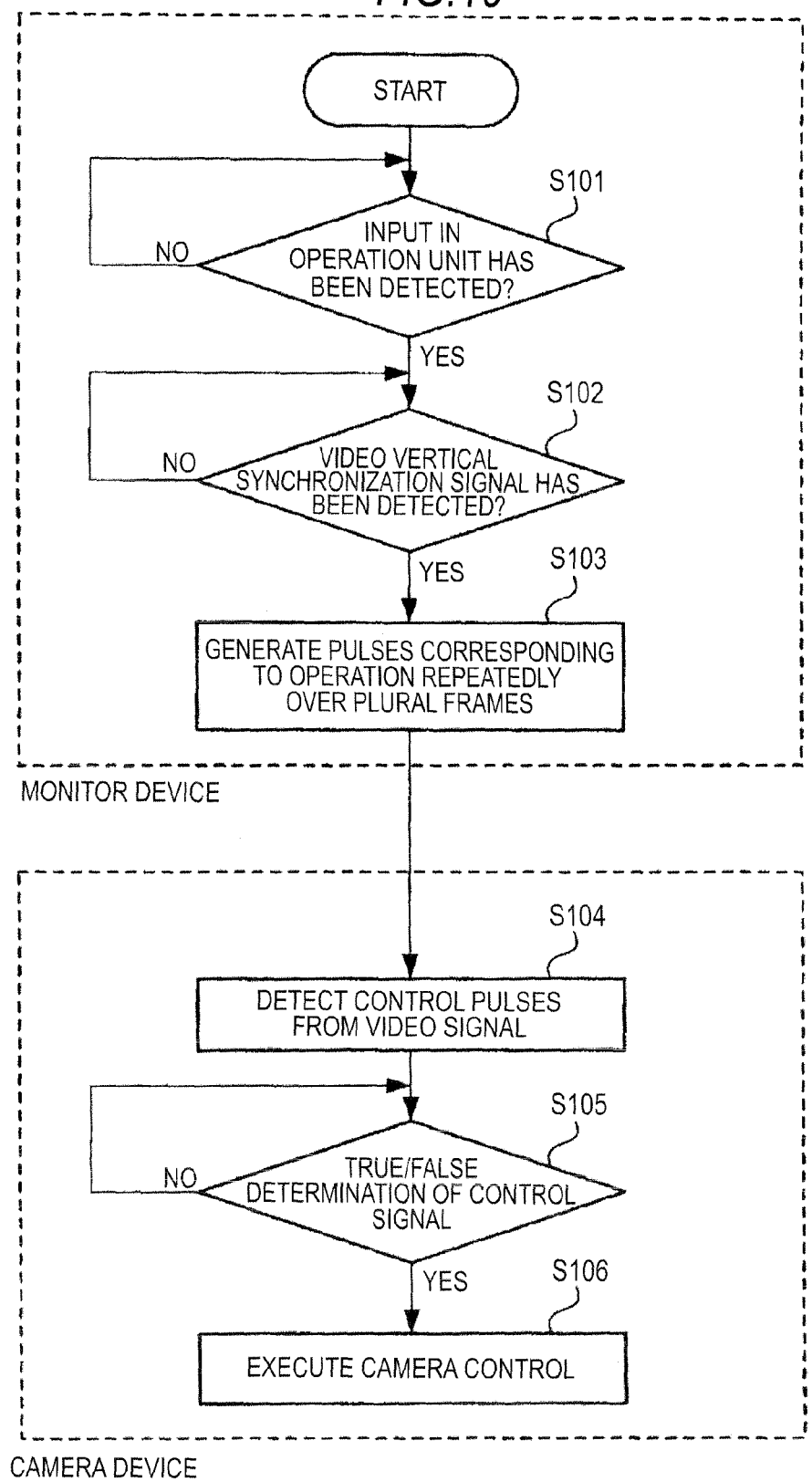

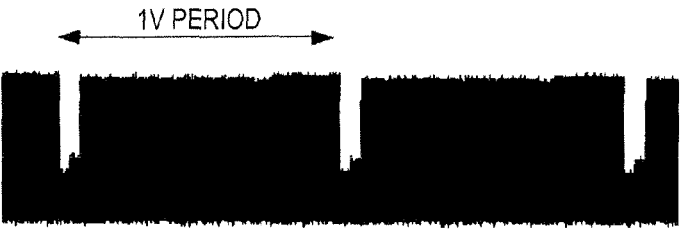
FIG.20A VIDEO SIGNAL WAVEFORM
FIG.20B CONTROL PULSE

CAMERA DEVICE, CAMERA SYSTEM AND CAMERA CONTROL METHOD

FIELD

The present disclosure relates to a camera device suitably applied to, for example, an in-vehicle camera device, a camera system including the camera device and a monitor device thereof and a camera control method applied to the camera device.

BACKGROUND

In related art, when a system is configured so that an in-vehicle camera device mounted on a car and so on is connected to a monitor device installed on the car to allow the monitor device to display taken video, the camera device is generally connected to the monitor device by a control line in addition to a transmission line for video. When control data can be transmitted from the monitor device to the camera device due to the connection by the control line, for example, power on/off, adjustment of brightness, switching of functions and so on in the camera device can be controlled on the side of the monitor device.

SUMMARY

However, it is not preferable as there is a problem that connection configuration will be complicated and a connector for cable connection will be large in size or complicated when the connection is performed by the control line in addition to the transmission line for video. Particularly, it is necessary to wire the cable extensively along a narrow space inside the car in the case of a system for the in-vehicle camera such as in a car, therefore, it is not preferable to add the cable other than the video transmission line.

In JP-A-2000-184363 (Patent Document 1), there is disclosed a technique of performing remote control of the camera device by superimposing a code signal on an analog video signal when the camera device is connected to a controller thereof by a signal cable.

Though the technique of superimposing some kind of control code on the video signal as in the Patent Document 1 has been proposed in the past, there is a problem that superimposition of the control code affects video transmitted from the camera device to some degree. Particularly, when transmitting the analog video signal, the control code is transmitted by the same transmission cable from the side receiving the analog video signal, there arises a problem that the analog video signal is affected during the transmission and the transmitted video signal is deteriorated.

In view of the above, it is desirable to control the camera device in good condition with simple connection between the camera device and the monitor device and so on.

According to an embodiment of the present disclosure, current variation or voltage variation superimposed on a video signal in a video signal line cable (hereinafter, merely referred to as a cable) outputting the video signal from the camera device is detected. Then, a control signal transmitted by the cable is determined based on the detected signal variation. The operation of the camera device is controlled based on the determined control signal.

The control signal shown by current variation or voltage variation is transmitted from an external device connected to the camera device by the transmission cable of the video signal as in the above manner, thereby controlling the camera device based on the transmission signal. In this case, the control signal shown by current variation or voltage variation can be transmitted without much affecting the transmission of the analog video signal through the transmission cable.

According to the embodiment of the present disclosure, the camera device can be controlled by current variation or voltage variation transmitted from the external device through the transmission cable when the camera device is connected to the external device such as the monitor device by the transmission cable for the transmission of the analog video signal. Therefore, it is not necessary to perform connection separately by the transmission cable for control, which simplifies the configuration at the time of setting the camera device.

BRIEF DESCRIPTION OF THE DRAWINGS

FIGS. 4A to 4D are explanatory views showing waveform examples of the control signal according to the first embodiment of the present disclosure;

FIGS. 5A to 5C are explanatory views showing waveform variation examples according to the first embodiment of the present disclosure;

FIGS. 12A to 12C show waveform diagrams showing examples of applying a voltage signal according to the second embodiment of the present disclosure;

FIGS. 13A and 13B are waveform diagrams showing the details of application states of the voltage signal according to the second embodiment of the present disclosure;

FIG. 14 is an explanatory chart showing an example at the time of operating respective buttons according to the second embodiment of the present disclosure;

FIG. 16 is an explanatory diagram showing a control signal example in the case of FIG. 15;

FIGS. 17A and 17B are waveform diagrams showing a transmission example (example 1) of the control signal applied to respective embodiments of the present disclosure;

FIGS. 18A and 18B are waveform diagrams showing a transmission example (example 2) of the control signal applied to respective embodiments of the present disclosure;

FIG. 19 is a flowchart showing a transmission processing example of the control signal applied to respective embodiments of the present disclosure; and FIGS. 20A and 20B show states in which the control pulses are sequentially generated over plural frames.

DETAILED DESCRIPTION

Figure 1:
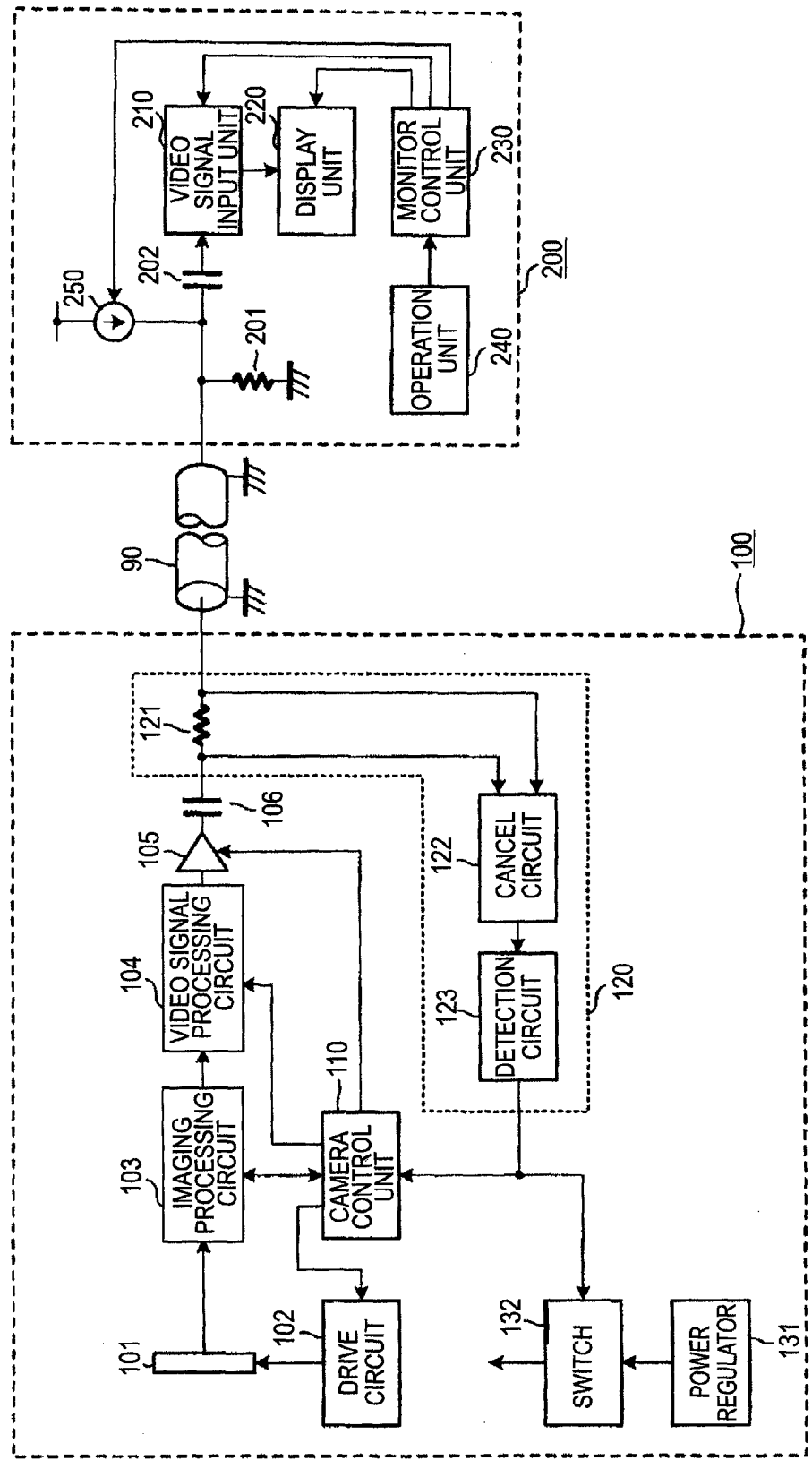
FIG. 1 is a block diagram showing an entire configuration example of a first embodiment of the present disclosure.

Embodiments of the present disclosure will be explained in the following order.
1 First Embodiment
1.1 Configuration example of a camera device and a monitor device (FIG. 1)
1.2 Explanation of a circuit configuration (FIG. 2, FIG. 3)
1.3 Operation explanation (FIGS. 4A-4D to FIG. 7)
1.4 Modification example 1 (FIG. 8)
1.5 Modification example 2 (FIG. 9, FIG. 10)
2 Second Embodiment
2.1 Configuration example of a camera device and a monitor device (FIG. 11)
2.2 Operation explanation (FIGS. 12A-12C to FIG. 14)
2.3 Modification example 1 (FIG. 15, FIG. 16)
3.1 Detailed examples of transmission configurations of the control signal applied to respective embodiments
3.2 Generation and determination processing example of the control signal applied to respective embodiments <1 First Embodiment>
1.1 Configuration Example Of A Camera Device And A Monitor Device An entire configuration example of a first embodiment of the present disclosure will be explained with reference to FIG. 1.

In the embodiment, a camera device 100 and a monitor device 200 are connected by a coaxial cable 90, and an analog video signal (video signal) outputted by the camera device 100 is supplied to the monitor device 200 through the coaxial cable 90. A control signal is transmitted from the monitor device 200 as an external device to the camera device 100 by the coaxial cable 90 which transmits the video signal. A processing configuration for transmitting the control signal to be described later is defined in the present disclosure as a processing configuration of transmitting the control signal without interrupting transmission of the analog video signal.

The camera device 100 and the monitor device 200 are configured as an in-vehicle camera system installed, for example, inside a car. The camera device 100 is installed at, for example, a rear end of the car and the monitor device 200 is installed at, for example, the front of a driver's seat. The camera device 100 and the monitor device 200 are connected by the coaxial cable 90. The monitor device 200 can be a display device configured by being combined with other functions such as a car navigation device. Alternatively, a configuration maybe possible in which a control device not having the display function is connected to the camera device 100 and control of the camera device 100 is performed by the control device and also the video signal transmitted to the control device is further transmitted to another display device from the control device.

Next, a configuration of the camera device 100 will be explained.

The camera device 100 includes an image sensor 101 corresponding to an imaging unit, allowing the sensor to generate an imaging signal based on incident image light through a not-shown optical system, and the imaging signal is read from the image sensor 101. The image sensor 101 performs imaging processing in synchronization with a drive pulse supplied from a drive circuit 102.

The image signal outputted from the image sensor 101 is supplied to a video signal processing circuit 104 as a video signal processing unit after various imaging processings are performed in an imaging processing circuit 103 and converted into an analog video signal (video signal) in a given format. For example, the imaging signal is converted into a video signal in an NTSC format and a synchronization signal corresponding to the format is added. The converted analog video signal is supplied to a video amplifier 105 and amplification for transmission is performed. The amplified video signal is supplied to an output terminal to which the coaxial cable 90 is connected through a capacitor 106 and a resistor 121. The video amplifier 105 performs amplification operation under control of a camera control unit 110 as a control means of the camera device 100. The resistor 121 doubles functions of impedance matching of the coaxial cable 90 and resistance for detection in a control signal detection unit 120 to be described later.

The coaxial cable 90 is connected to a video input terminal of the monitor device 200, connecting the analog video signal transmitted through the coaxial cable 90 to a video signal input unit 210 through a capacitor 202. A node between the capacitor 202 and the video input terminal is connected to the ground side through a resistor 201 of 750Ω. Additionally, electric current is supplied from a current source 250 to the node between the capacitor 202 and the video input terminal. The current source 250 is provided as a control signal superimposition unit for supplying the control signal, and is controlled by a monitor control unit 230.

The video signal input unit 210 performs input processing of the video signal and supplies the signal to a display unit 220 to display video on a display panel. The display processing in the monitor device 200 is executed under control of the monitor control unit 230. Operation instructions are supplied from an operation unit 240 to the monitor control unit 230. The operation unit 240 includes buttons and so on operated by the user. For example, a button for activating the entire camera system and the like are prepared.

The monitor control unit 230 performs control of transmitting the control signal to the camera device 200. The control signal is transmitted through the coaxial cable 90 and is indicated by a supplying state of current by the current source 250. Though the details of the supplying state of the control signal will be described later, current is supplied within a vertical blanking interval of the video signal in the control signal in the present embodiment.

The video signal input unit 210 of the monitor device 200 includes a synchronization signal detection circuit which detects a vertical synchronization signal and a horizontal synchronization signal. The video signal input unit 210 has a configuration of generating a control signal in a control signal generation circuit in synchronization with the timing of the detection in the synchronization signal detection circuit.

Return to the explanation for the configuration of the camera device 100, and the control signal detection unit 120 for detecting current supplied from the monitor device side is connected to the resistor 121 connected to the video output terminal of the camera device 100. That is, one terminal and the other terminal of the resistor 121 are respectively connected to a cancel circuit 122, video signal components to be transmitted are cancelled in the cancel circuit 122, and current flowing from the monitor device 200 side through the coaxial cable 90 is detected in a detection circuit 123 connected to the cancel circuit 122. A specific configuration example of the control signal detection unit 120 will be described with reference to FIG. 2.

A detection signal obtained in the detection circuit 123 is supplied to the camera control unit 110 as well as to a switch 132. The switch 132 is a switch for turning on/off the output of a power regulator 131. When the switch 132 is turned on, power is supplied to respective units of the camera device 100 to thereby be in an activated state in which imaging operation is performed and the video signal is outputted. When the switch 132 is turned off, the camera device 100 is in a standby state or an off state, in which imaging operation is not performed and the video signal is not outputted.

When the control signal for turning on the camera device is determined in the camera control unit 110, the camera control unit 110 performs control of operating respective units. Processing of determining whether the received control signal is an erroneous control signal due to noise or a right control signal is also performed. The noise processing will be also described later.

[1.2 Explanation of a Circuit Configuration]

Next, a circuit configuration example in which the control signal by electric current transmitted from the monitor device 200 is detected by the camera device 100 will be explained with reference to FIG. 2 and FIG. 3.

Figure 2:
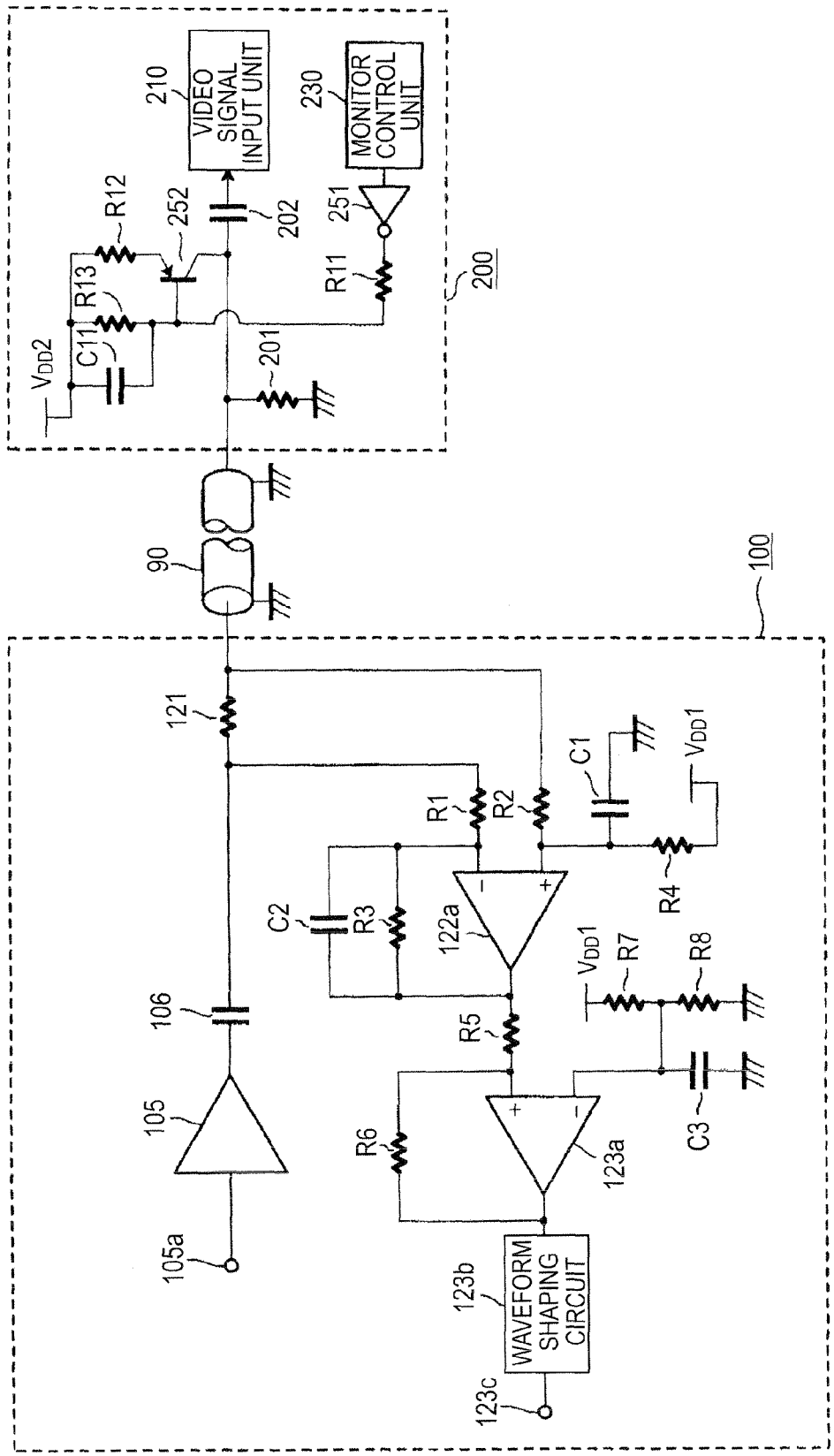
FIG. 2 is a circuit diagram showing a circuit configuration example of the first embodiment of the present disclosure.

As shown in FIG. 2, the monitor device 200 supplies a power supply voltage $V_{DD}2$ to an emitter of a transistor 252 through a resistor R12 and supplies a signal (current) obtained at a collector of the transistor 252 to the terminal to which the coaxial cable 90 is connected.

An instruction output from the monitor control unit 230 is supplied to a base of the transistor 252 through an inverter 251 and a resistor R11, and the instruction output from the monitor control unit 230 turns on the transistor 252. A parallel circuit of a resistor R13 and a capacitor C11 is connected between a terminal where the power supply voltage $V_{DD}2$ is obtained and the base of the transistor 252.

As the monitor device 200 side has the above configuration, current flows in the coaxial cable 90 in synchronization with the instruction outputted from the monitor control unit 230. The resistor R12 is connected to the emitter of the transistor 252 to thereby keep dynamic impedance in the collector of the transistor 252 high, which has little effect on video amplitude when the current flows.

As a configuration of detecting the current by the camera device 100, one terminal of the other terminal of the resistor 121 connected to the coaxial cable 90 are connected to a differential amplifier 122a through different resistors R1, R2 respectively, and video signal components flowing in the resistor 121 are cancelled in the differential amplifier 122a to generate a voltage corresponding to a current component.

Concerning the differential amplifier 122a, one terminal of a resistor R4 is connected between the resistor R2 and a positive-side input terminal of the differential amplifier 122a and a power supply voltage $V_{DD}1$ is supplied to the other terminal of the resistor R4. A junction point between one terminal of the resistor R4 and the resistor R2 is grounded through a capacitor C1. Moreover, a parallel circuit of a capacitor C2 and a resistor R3 is connected between a negative-side input terminal and an output terminal of the differential amplifier 122a.

The capacitor C1 and the capacitor C2 have a function of effectively cancelling components of the video signal including high-frequency components even when a slew rate of the differential amplifier 122a is relatively low. In the case of the circuit configuration shown in FIG. 2, weight is changed in resistance connected to the positive-side input terminal of the differential amplifier 122a and in resistance connected to the negative-side input terminal, thereby detecting current flowing from the monitor device 200 side correctly.

A signal obtained at the output terminal of the differential amplifier 122a functioning as a circuit of cancelling video signal components is supplied to a positive-side input terminal of a differential amplifier 123a of a next stage through a resistor R5.

The differential amplifier 123a functions as a hysteresis comparator where a voltage obtained by dividing the power supply voltage $V_{DD}1$ in resistors R7, R8 and accumulated in the capacitor C3 can be obtained at a negative-side input terminal. A positive-side input terminal and an output terminal of the differential amplifier 123a are connected through a resistor R6.

An output of the differential amplifier 123a functioning as the hysteresis comparator is supplied to a waveform shaping circuit 123b and a signal in which waveform change is detected is obtained at an output terminal 123c. The waveform variation obtained at the output terminal 123c corresponds to current variation transmitted from the monitor device 200 side through the coaxial cable 90. The signal obtained at the output terminal 123c is supplied to the camera control unit 110 and is supplied to the switch 132 to be controlled.

Figure 3:
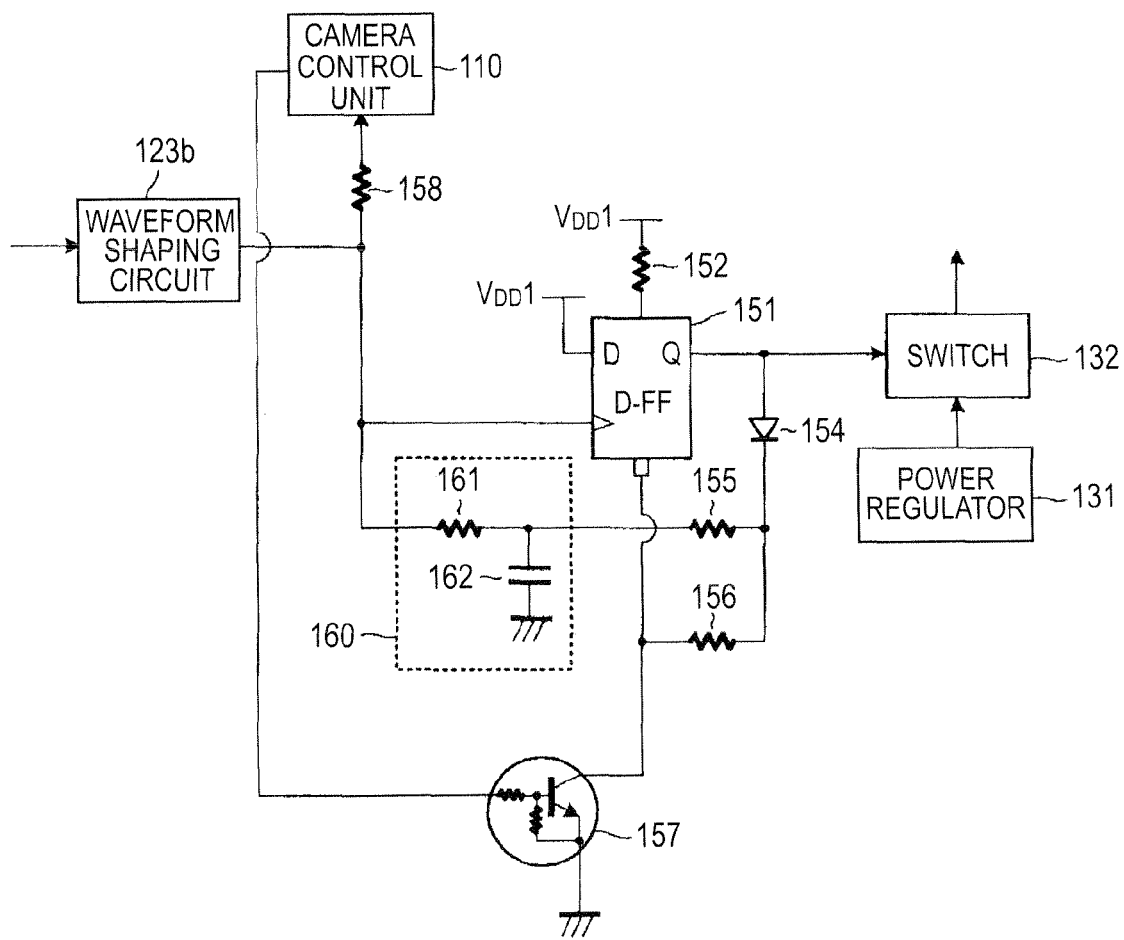
FIG. 3 is a circuit diagram showing a detection configuration example of a control signal according to the first embodiment of the present disclosure.

FIG. 3 is a circuit diagram showing an example of a configuration in which the switch 132 is controlled by the output of the waveform shaping circuit 123b.

The output of the waveform shaping circuit 123b is directly supplied to the camera control unit 110 through a resistor 158 and is supplied to a clock input terminal of a D flip-flop 151. The power supply voltage $V_{DD}1$ is supplied to a D-input terminal of the D flip-flop 151, and a signal obtained at a Q-output terminal is outputted to the switch 132 to be controlled. The power supply voltage $V_{DD}1$ is supplied to a power supply input of the D flip-flop 151 through a resistor 152. To a reset terminal, the signal obtained at the Q-output terminal is supplied through a diode 154 and a resistor 156. The output of the waveform shaping circuit 123b is also supplied to a junction point between the diode 154 and the resistor 156 through a resistor 161 and a capacitor 162 included in a low-pass filter 160 and a resistor 155. Additionally, the output of the camera control unit 110 is supplied to the reset terminal through a transistor 157.

As described above, the camera device 100 directly controls the power supply switch 132 due to the control signal by electric current from the monitor device 200 side to activate the camera device 100 from a power-off state to a power-on state.

[1.3 Operation Explanation]

Next, a state of transmitting the control signal from the monitor device 200 to the camera device 100 will be explained with reference to FIG. 4A to FIG. 7.

First, operation of the configuration in which the switch 132 is controlled shown in FIG. 3 will be explained with reference to FIGS. 5A to 5C.

When a detection signal as the output of the signal shaping circuit 123a shown in FIG. 5A rises, the Q-output of the D flip-flop is inverted as shown in FIG. 5C. FIG. 5B shows the potential of the reset terminal.

Here, the low-pass filter 160 shown in FIG. 3 is connected, therefore, the potential of the reset terminal remains lower than a threshold V0 in a state in which a detection signal rises for a short period, as shown by a signal in a period Va shown in FIG. 5B. When the detection signal rises somewhat sequentially, the potential of the reset terminal exceeds the threshold V0 as shown by a signal in a period Vb shown in FIG. 5B, then, the reset is cancelled and a high-level "H" of the D-input terminal is loaded. In this state, the Q-output is supplied to the reset terminal through the diode 154 to thereby allow the signal to be in the high level, and the Q-output is maintained to the high-level even when the detection signal varies.

Accordingly, the switch 132 which is the power switch of the camera device 100 can be directly turned on due to the control signal by electric current. When the switch 132 is turned on once, the on-state is maintained even in the case where the control signal is not supplied from that time.

When the switch 132 is turned off, an instruction for turning on the transistor 157 is transmitted from the camera control unit 110 to forcibly allow the reset terminal to be in a low level "L". Therefore, the instruction from the camera control unit 110 can allow the camera device to be in a power-off state by turning off the switch 132.

Next, a transmission state at the time of transmitting the control signal from the monitor device 200 to the camera device 100 through the co-axial cable 90 will be explained with reference to FIGS. 4A to 4D. In the embodiment, the control signal is outputted during a vertical blanking interval of a video signal in a state in which the analog video signal is outputted to the coaxial cable 90 from the camera device 100.

FIG. 4A shows a state in which on/off control of the current supply 250 (FIG. 1) is performed and FIG. 4B shows an analog video signal waveform transmitted by the coaxial cable 90. Control signals instructing various control states are generated by a period of turning on/off the current source shown in FIG. 4A.

All signal waveforms shown in FIG. 4B are waveforms in the vertical blanking interval, and a pulse HB of a horizontal blanking interval is inserted in each horizontal period.

When the current signal by the on/off of the current source shown in FIG. 4A is supplied in the state of the signal in the vertical blanking interval, the cancel circuit 122 in the control signal detection unit 120 of the camera device 100 outputs waveforms rising and falling so as to correspond to on/off of the current as shown in FIG. 4C. The output waveforms of the cancel circuit 122 are waveforms obtained by rounding current waveforms supplied by the monitor device side, and rectangular waves corresponding to on/off of the current source shown in FIG. 4D are detected in the waveform shaping circuit in the detection circuit 123. The control state is determined by the period of the rectangular wave and so on.

Figure 6:
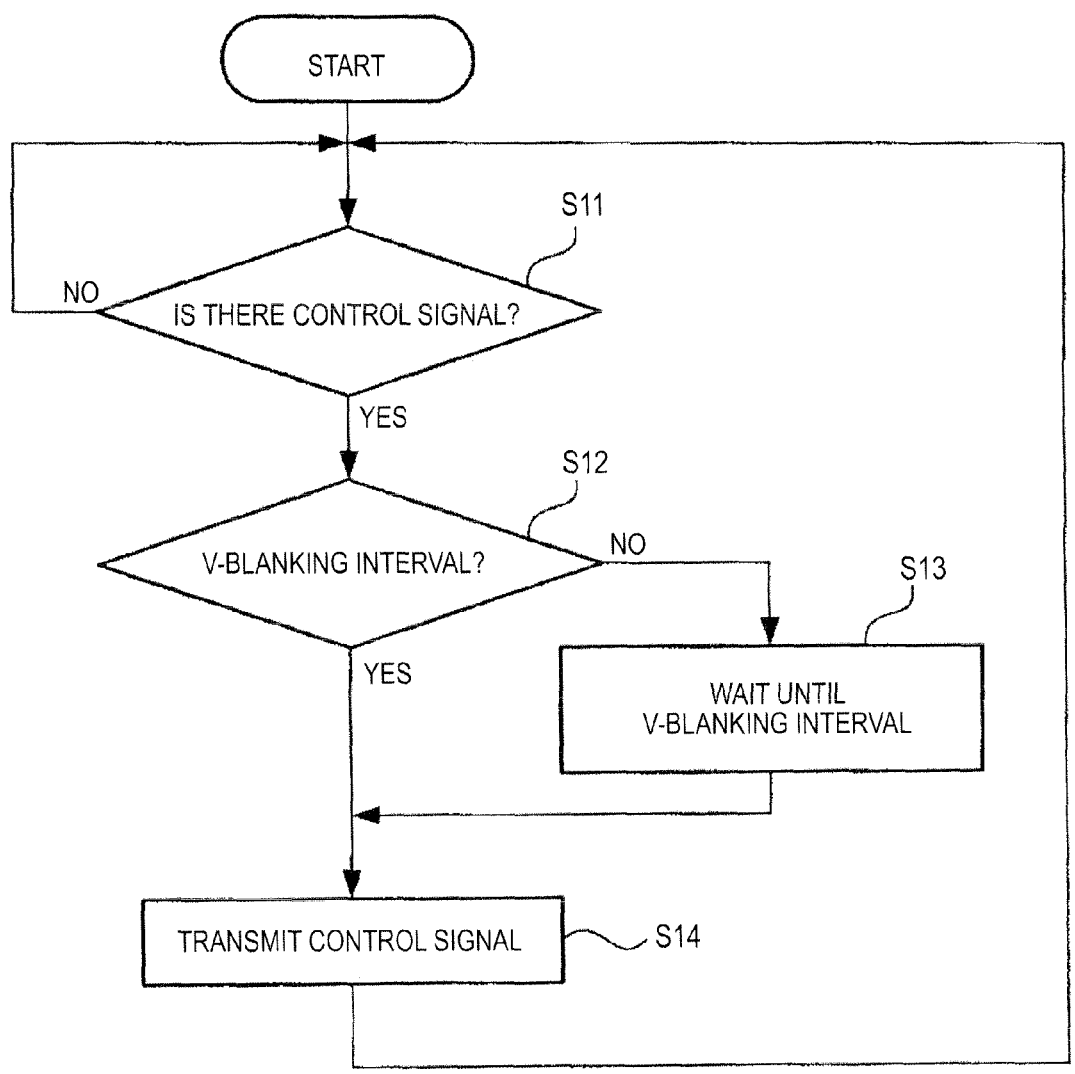
FIG. 6 is a flowchart showing a transmission processing example of the control signal according to the first embodiment of the present disclosure.

A flowchart of FIG. 6 shows control processing performed when the control signal is transmitted on the monitor device 200 side. First, the monitor control unit 230 determines whether there is a control signal to be transmitted to the camera device side or not (Step S11). Here, when there is the control signal, the monitor control unit 230 determines whether the video signal supplied at present is in the vertical blanking interval or not (Step S12). When the video signal is not in the vertical blanking interval, the device waits until the vertical blanking interval (Step S13).

When it is determined that the signal is in the vertical blanking interval in Step 12 and when the signal enters the vertical blanking interval after waiting in Step S13, the control signal is transmitted by turning on/off the current source 250. The control signal in one unit is completed in one vertical blanking interval. When the control signal exceeds the length of one vertical blanking interval, a remaining control signal is transmitted in the next vertical blanking interval. After the transmission of the control signal is completed, process returns to the determination processing in Step S11. In the case where the video signal is not supplied such as in the case of activating the camera device first, the determination processing in the vertical blanking interval is not performed.

When the camera device 100 is activated to the on-state by transmitting a control signal from the monitor device 200, a control signal for maintaining the on-state is transmitted in the vertical blanking interval again after a certain period of time passes from the transmission of the control signal for activation.

Figure 7:
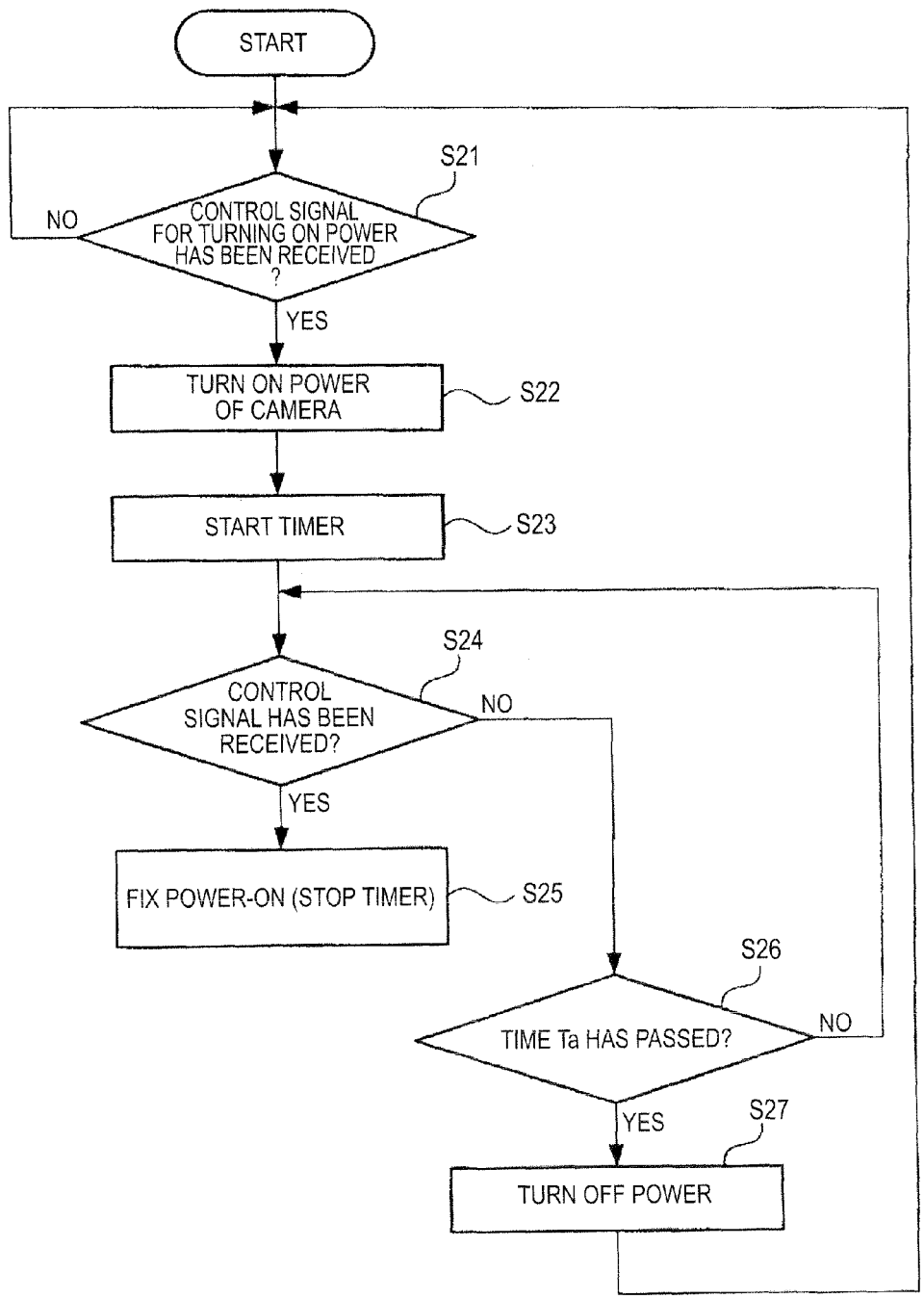
FIG. 7 is a flowchart showing a processing example when the power is on in a camera device according to the first embodiment of the present disclosure.

Next, processing in the camera control unit 110 performed when the switch 132 is turned on by the control signal on the camera device 100 side and the camera device 100 is activated will be shown by a flowchart of FIG. 7.

First, whether the switch 132 has been changed from the off-state to the on-state by receiving the control signal for turning on the power or not is determined (Step S21). When the switch 132 is turned on, the camera device 100 is in the power-on state by the turning-on of the switch 132 (Step S22) and a timer for determining the power-on is started (Step S23). Then, the camera control unit 110 determines whether the control signal for maintaining the on-state has been received from the monitor device 200 side in the vertical blanking interval of the video signal or not (Step S24). When the control signal is received, the power-on state is fixed and the timer for determining the power-on is stopped (Step S25).

When it is determined that the control signal is not received in Step S24, whether a given time Ta has passed or not is determined (Step S26). For example, a period from 30 seconds to several minutes is set as the time Ta. The determination of receiving the control signal in Step S24 is repeated until the time Ta passes.

Then, when it is determined that the given time Ta has passed in Step S26, the switch 132 is forcibly turned off under control of the camera control unit 110 (Step S27), and the device waits until receiving the next control signal.

As the processing shown in FIG. 7 is performed, when the control signal for maintaining the power-on state is not transmitted in the case where the power is turned on by improperly detecting some noise as a control signal, the camera device 100 determines a malfunction and returns to the power-off state. Therefore, if the power is improperly turned on due to noise temporarily, the power is turned off after the time set by the timer passes, which prevents continuation of the power-on state due to the malfunction.

[1.4 Modification Example 1]

Figure 8:
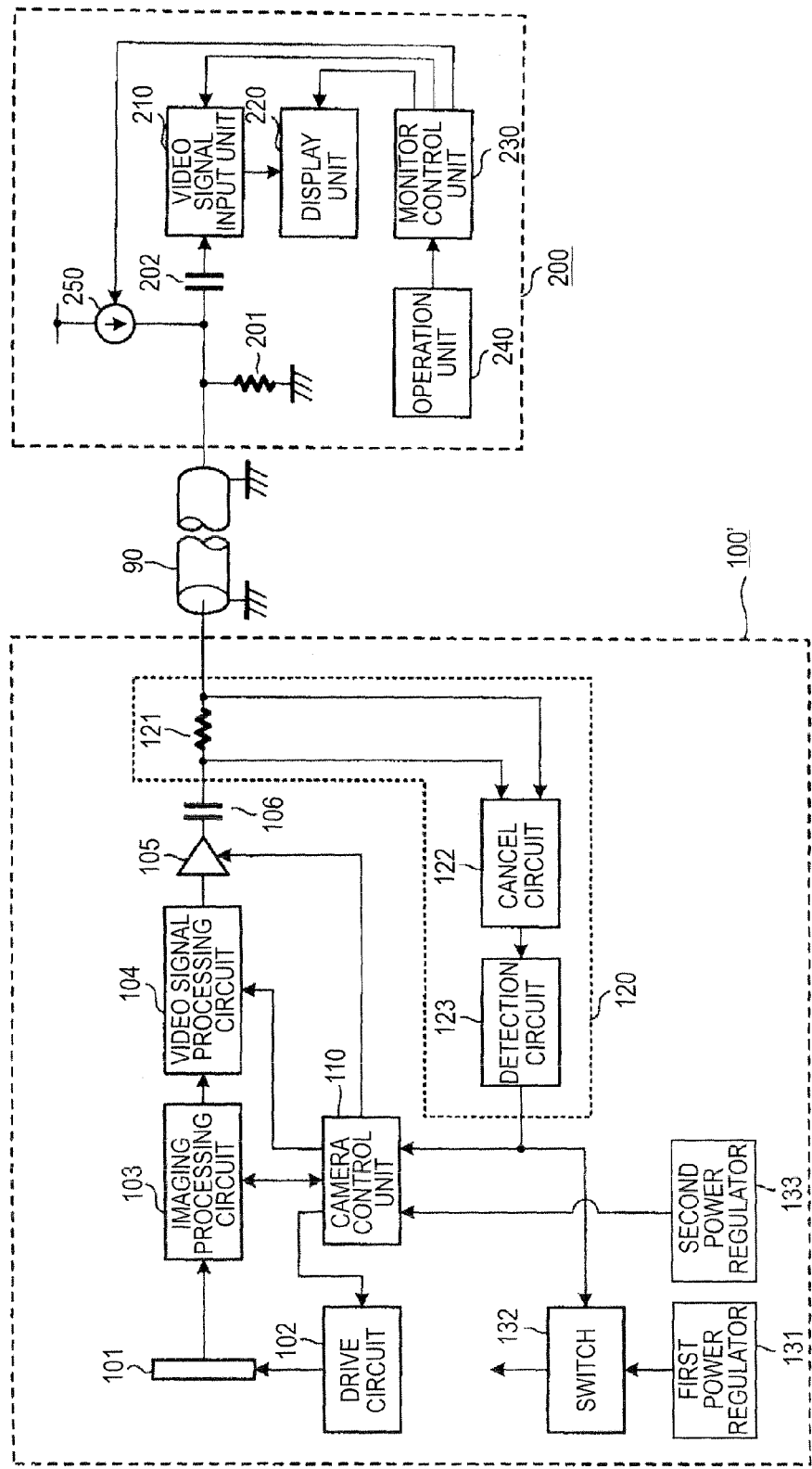
FIG. 8 is a block diagram showing an entire configuration example of a modification example (modification example 1) of the first embodiment of the present disclosure.

FIG. 8 shows a modification example 1 of a system configuration of the camera device and the monitor device shown in FIG. 1. In FIG. 8, the same numerals as FIG. 1 are given to components corresponding to FIG. 1.

In the example of FIG. 8, a camera device 100' and the monitor device 200 are connected by the coaxial cable 90. A basic configuration of the camera device 100' is the same as the camera device 100 shown in FIG. 1.

The camera device 100' of FIG. 8 includes a second power regulator 133 in addition to the power regulator 131 shown in FIG. 1 as a power supply configuration. In FIG. 8, the power regulator 131 is shown as a first power regulator.

The output power of the first power regulator 131 is turned on/off by the switch 132 and the output power of the second power regulator 133 is constantly supplied to the camera control unit 110. Therefore, the power is constantly supplied to the camera control unit 110 and minimum control operation such as transmission of the control signal from the monitor device is constantly performed.

[1.5 Modification Example 2]

Figure 9:
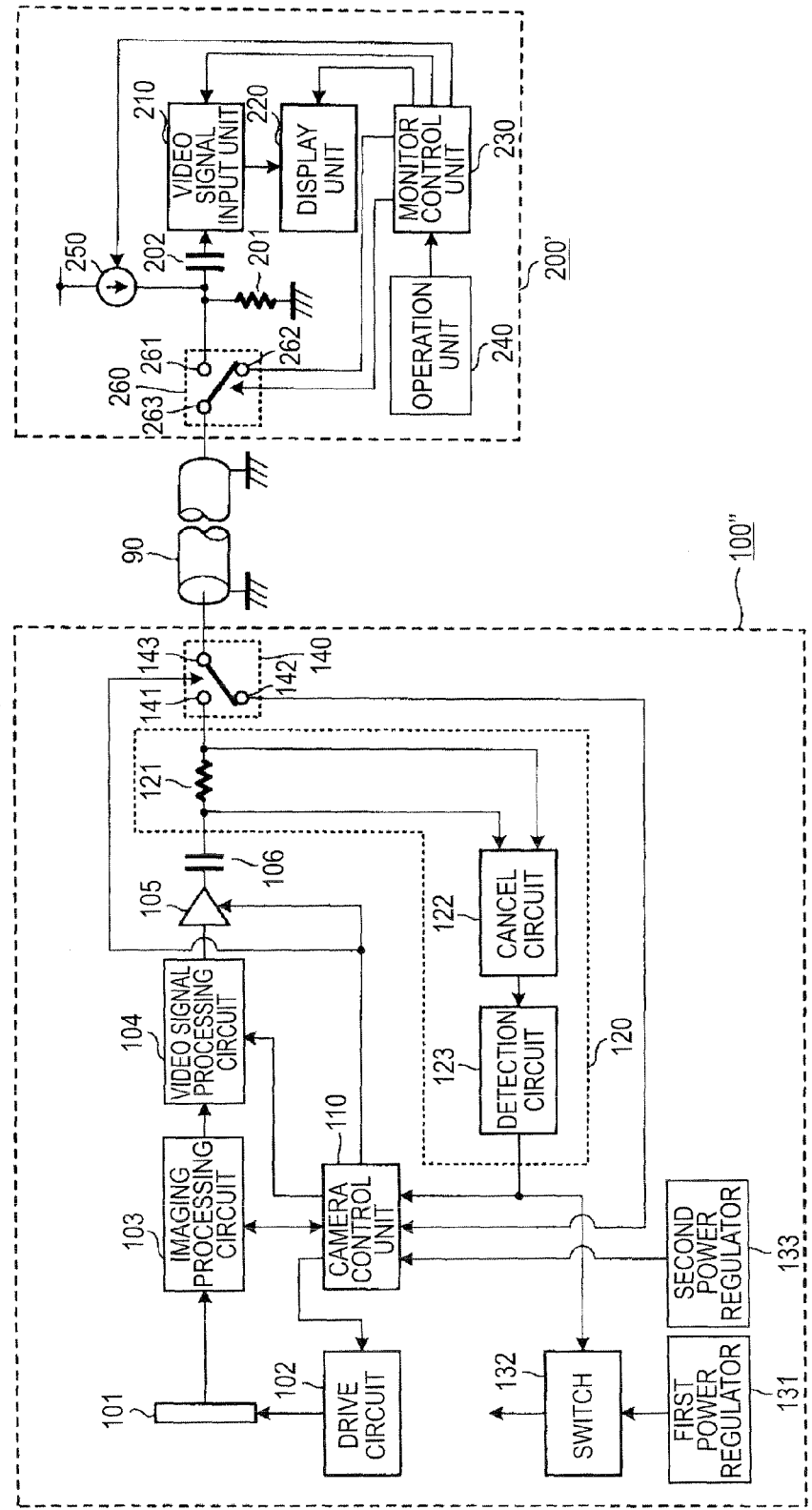
FIG. 9 is a block diagram showing an entire configuration of a modification example (modification example 2) of the first embodiment of the present disclosure.

FIG. 9 shows a modification example 2 of a system configuration of the camera device and the monitor device shown in FIG. 1. In FIG. 9, the same numerals as FIG. 1 are given to components corresponding to FIG. 1.

In the example of FIG. 9, a camera device 100" and a monitor device 200' are connected by the coaxial cable 90. A basic configuration of the camera device 100" is the same as the camera device 100 shown FIG. 1, and a basic configuration of the monitor device 200' is also the same as the monitor device 200 shown in FIG. 1.

In the example of FIG. 9, a changeover switch 140 is provided in the camera device 100" at an output terminal portion to be connected to the coaxial cable 90. Also in the monitor device 200', a changeover switch 260 is provided at an input terminal portion to be connected to the coaxial cable 90.

In the changeover switch 140 of the camera device 100", when a contact 143 on the coaxial cable 90 side is connected to a contact 141 on an output side of the video signal, connection will be the same as the camera device 100 shown in FIG. 1 and the video signal is outputted. When the contact 143 on the coaxial cable 90 side is connected to another contact 142, the coaxial cable 90 is directly connected to the camera control unit 110.

In the case where adjustment and so on of the camera device 100" are performed by an instruction from the monitor device 200', the coaxial cable 90 is directly connected to the camera control unit 110, the contact 141 on the output side of the video signal is connected to the contact 143 during normal imaging processing.

The control of changeover in the changeover switch 140 is performed by the camera control unit 110. In a state in which the camera control unit 110 changes over the changeover switch 140 and directly connects the coaxial cable 90 to the camera control unit 110, the video amplifier 105 is not activated.

In the changeover switch 260 on the monitor device 200' side, a contact 263 on the coaxial cable 90 side is normally connected to a contact 261 on the video signal input unit 210 side. When adjustment and so on of the camera device are performed, the contact 263 is connected to a contact 262 which is directly connected to the monitor control unit 230. The changeover switch 260 is controlled by the monitor control unit 230.

Figure 10:
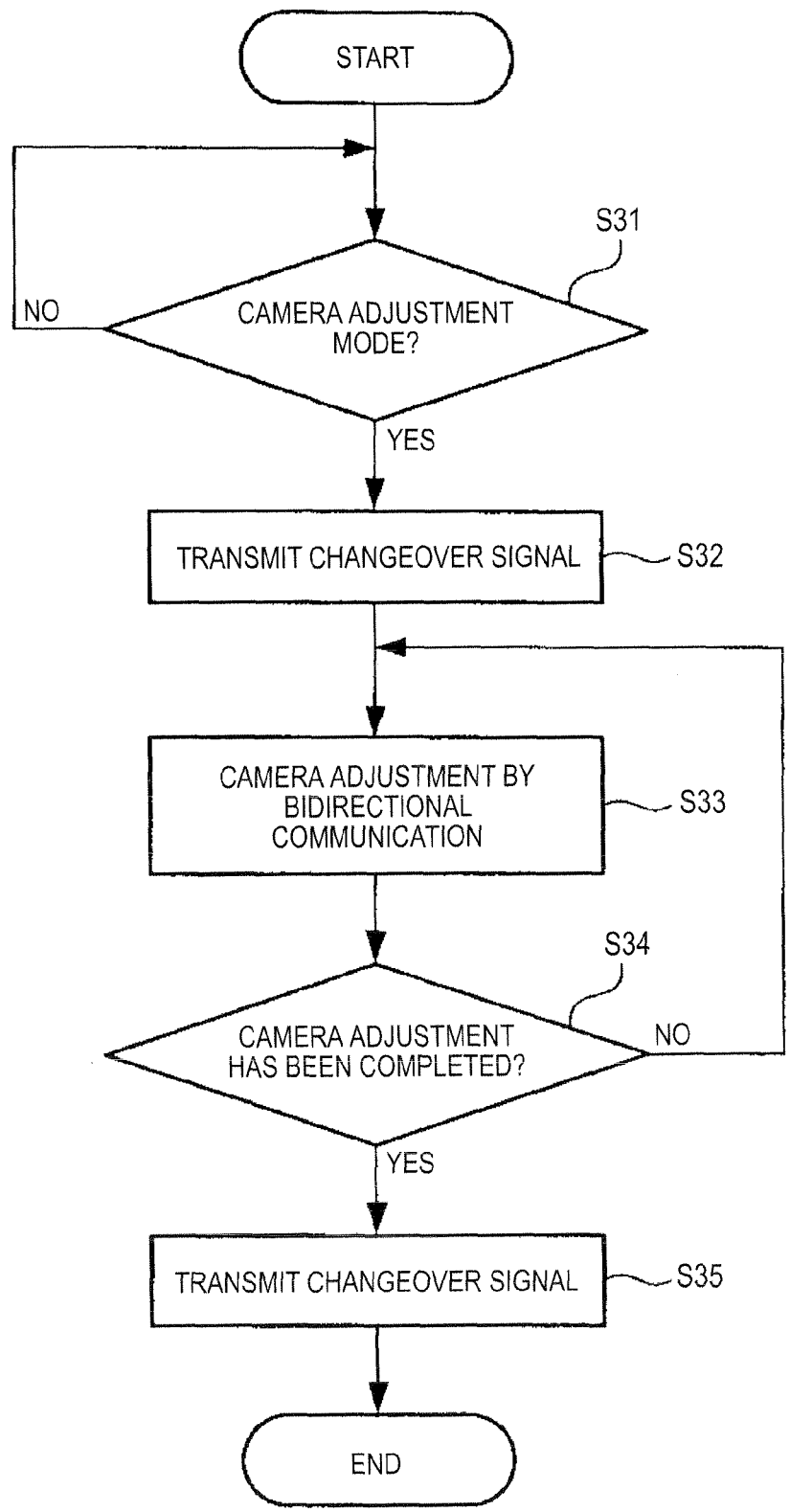
FIG. 10 is a flowchart showing a switching processing example in the case of the modification example 2 of FIG. 9.

FIG. 10 is a flowchart showing processing performed when respective changeover switches 140, 260 are changed over to perform adjustment in the case of the configuration shown in FIG. 9.

FIG. 10 shows control operation on the monitor device 200' side, and the monitor control unit 230 first determines whether a present control mode is a camera adjustment mode or not (Step S31). When the control mode is not the camera control mode, operation in a normal mode in which the video signal from the camera device 100" is received and displayed is performed.

When the control mode is the camera adjustment mode, a control instruction for changing over the switch 140 on the camera device side is transmitted as a control signal transmitted in the vertical blanking interval of the video signal (Step S32). After the control signal is transmitted, the switch 260 of the monitor device 200' is changed over to the monitor control unit 230 side from the video transmission mode.

In the camera device 100" which has received the control signal, changeover is performed so that the contact 143 touches the contact 142 to thereby connect the camera control unit 110 to the monitor control unit 230 by the coaxial cable 90 in a state in which direct communication is possible. In such state, bidirectional communication is performed by a given communication protocol between the both control units 110, 230 and the adjustment of the camera device 100" is performed (Step S33). When completion of the camera adjustment is determined (Step S34), the control signal instructing the changeover is transmitted from the monitor control unit 230 in the bidirectional communication state (Step S35). The changeover switch 140 is returned to the original state based on the control signal and the changeover switch 260 on the monitor device 200' side is also returned to the original state.

The above described configuration also enables fine adjustment of the camera device.

[2 . Second Embodiment]
[2.1 Configuration Example of a Camera Device and a Monitor Device]

Next, a configuration example of a second embodiment of the present disclosure will be explained with reference to FIG. 11.

Also in the second embodiment, a camera device 100*a* and a monitor device 200*a* are connected by the coaxial cable 90, and an analog video signal (video signal) outputted by the camera device 100*a* is supplied to the monitor device 200*a* through the coaxial cable 90. A control signal is transmitted from the monitor device 200*a* as an external device to the camera device 100*a* by the coaxial cable 90 which transmits the video signal. The configuration for imaging in the camera device 100*a* is the same as the configuration of the camera device 100 already explained in the first embodiment with reference to FIG. 1 and the like, while the configuration of receiving the control signal is different. Concerning the monitor device 200*a* , the configuration of performing display based on the inputted video signal is the same as the configuration of the monitor device 200 explained in FIG. 1 and so on, while the configuration of transmitting the control signal is different.

The control signal is transmitted from the monitor device as a current signal in the first embodiment, however, the control signal is transmitted from the monitor device 200*a* to the camera device 100*a* as a voltage signal in the second embodiment.

Figure 11:
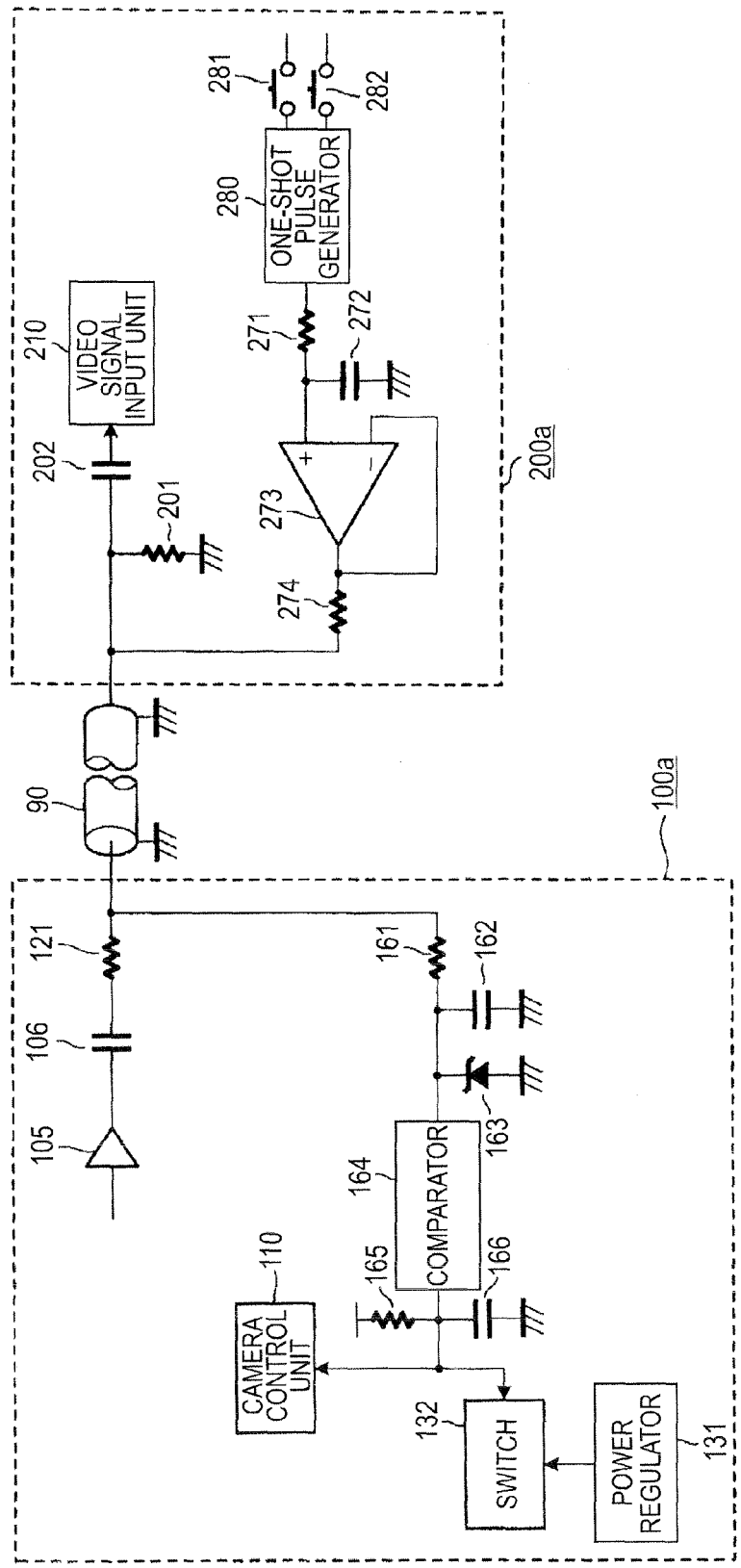
FIG. 11 is a circuit diagram showing a configuration example of a second embodiment of the present disclosure.

That is, the monitor device 200*a* includes a one-shot pulse generator 280 as a control signal generating means as shown in FIG. 11, in which different control pulses are outputted when two buttons 281, 282 are pressed. The control pulses outputted by the one-shot pulse generator 280 are supplied to a positive-side input terminal of an operational amplifier 273 through a resistor 271 and a capacitor 272 included in a low-pass filter. A negative-side input terminal of the operational amplifier 273 is connected to an output terminal to perform amplification, and the output is supplied to a video input terminal portion of the monitor device through a resistor 274 to be outputted from the coaxial cable 90.

Therefore, when the button 281 or 282 is pressed, a DC voltage component is applied to the coaxial cable 90 as the video signal transmission line. The application state differs according to respective buttons 281, 282, and the application state further differs when both two buttons 281, 282 are pressed. In the embodiment, the voltage is gradually increased so as not to affect the transmission of the video signal and the application of the DC voltage is maintained for a given period of time, then, the voltage is gradually restored so as not to further affect the transmission of the video signal. The duration of application of the DC voltage differs according to respective buttons.

On the camera device 100*a* side, a signal obtained at the video output terminal portion to which the coaxial cable 90 is connected is inputted to a comparator 164 through the resistor 161 and the capacitor 162 included in the low-pass filter to detect voltage application in the comparator 164. A Zener diode 163 is connected between an input portion of the comparator 164 and a grounded potential portion. The detected control signal is supplied to the camera control unit 110 based on the detection of voltage and the output of the power regulator 131 is controlled by controlling the switch 132. An output portion of the comparator 164 is connected to a junction point between a resistor 165 and a capacitor 166 connected between a power potential portion and a grounded potential portion.

[2.2 Operation Explanation]

FIGS. 12A to 12C show the voltage application state. Assume that a video signal outputted from the camera device 100a is in a state shown in FIG. 12A and a DC voltage component outputted in the monitor device 200a is in a level shown in FIG. 12C. In this case, a state in which DC bias is applied to the video signal as shown in FIG. 12B is obtained on the coaxial cable 90.

FIG. 13A shows a voltage signal to be applied to the video signal line. FIG. 13B shows examples of voltage waveforms in respective units. A signal (b-1) of FIG. 13B shows the video signal line after the voltage application. A signal (b-2) of FIG. 13B shows a signal detected in the comparator 164. A signal (b-3) shows a signal outputted from the comparator 164. FIG. 14 is a chart showing states obtained when respective buttons are pressed. A-button of FIG. 14 shows the button 281 of FIG. 11 and B-button of FIG. 14 shows the button 282 of FIG. 11.

As shown in FIG. 13A, voltage is increased during a time T1 and the applied voltage is maintained during a time T2, then, processing of restoring the voltage is performed during a time T3.

As shown in FIG. 14, the rising period T1 and the falling period T3 are constant at 100 ms respectively and the fixed period T2 varies according to respective button operations, which are control signals for different purposes. In the example of FIG. 14, the voltage is fixed for 200 ms when the button 281 is pressed, for 400 ms when the button 282 is pressed and for 800 ms when both buttons 281, 282 are pressed. The voltage application is performed regardless of the output timing of the video signal, which is different from the first embodiment.

As described above, the control signal of the camera device can be transmitted by voltage application from the monitor device side through the coaxial cable 90. In this case, the voltage is changed slowly as shown in FIG. 13A, which has little effect on the video signal received by the monitor device.

[2.3 MODIFICATION EXAMPLE 1]

Figure 15:
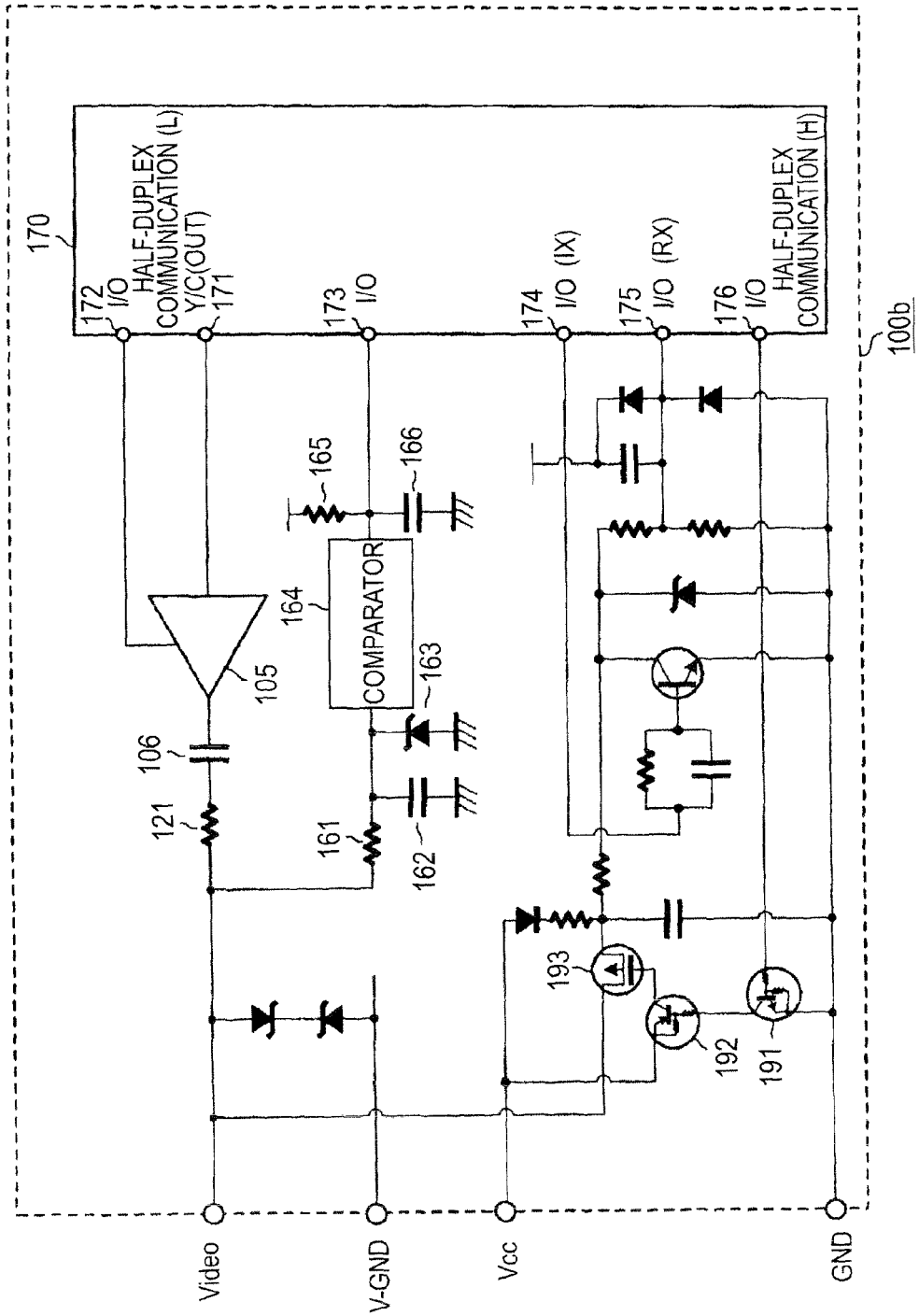
FIG. 15 is a circuit diagram showing a modification example of the second embodiment of the present disclosure.

FIG. 15 shows an example of a camera device 100b having a configuration in which a voltage signal is applied as a control signal and half-duplex communication is performed.

In the camera device 100b shown in FIG. 15, a video signal output unit 170 is shown in one block. A signal obtained at a video signal output terminal 171 of the video signal output unit 170 is supplied to the video output terminal through the video amplifier 105, the capacitor 106 and the resistor 121. In the video amplifier 105, operation is controlled by a signal obtained at a half-duplex communication control terminal 172. A voltage signal detected in a comparator 164 is connected to a control signal input terminal 173.

A configuration of performing half-duplex communication with the monitor device side is connected in addition to the voltage signal detected in the comparator 164. That is, the video signal output unit 170 includes a transmission terminal 174 and a receiving terminal 175 for half-duplex communication, in which processing of allowing the transmission terminal 174 and the receiving terminal 175 to be effective is performed at the time of half-duplex communication by an output voltage obtained at a half-duplex communication control terminal 176. That is, the connection configuration is formed in which the processing of allowing the transmission terminal 174 and the receiving terminal 175 to be effective is performed by transistors 191, 192 and 193 connected to the half-duplex communication control terminal 176. In the example of FIG. 15, a power supply terminal VCC supplying DC power and a ground terminal GND are also included.

FIG. 16 shows an example of a control signal transmitted at the time of half-duplex communication.

As shown in FIG. 16, transmission of the control signal within four seconds at the maximum will be transmitted.

[3.1 Detailed Examples of Transmission Configurations of the Control Signal Applied to Respective Embodiments]

FIGS. 17A and 17B and FIGS. 18A and 18B show examples of transmission states of the control signal (control pulses) obtained by current superimposition from the monitor device in respective embodiments such as the first embodiment.

FIGS. 17A and 17B show an example in which control pulses shown in FIG. 17B are generated in synchronization with a horizontal synchronization signal in a vertical blanking interval (V-blanking interval) shown in FIG. 17A. In the example, six control pulses are sequentially generated and superimposed by using six horizontal periods as shown in FIG. 17B. As described above, the vertical blanking period of the video signal to be transmitted is detected and control pulses synchronized with the horizontal periods are generated and transmitted within the detected vertical blanking period on the monitor device side.

FIGS. 18A and 18B show an example in which control pulses shown in FIG. 18B are generated in synchronization with a horizontal synchronization signal in a vertical blanking interval (V-blanking interval) shown in FIG. 18A. In the example, nine control pulses are sequentially generated and superimposed by using nine horizontal periods as shown in FIG. 18B.

Plural times of control pulses shown in FIGS. 17A and 17B and FIGS. 18A and 18B give purposes of control by the number of times of the repeated control pulses by repeating the same control pulses. It is also preferable that control pulses have different waveforms and respective pulses give purposes of control.

[3.2 Generation and Determination Processing Example of the Control Signal Applied to Respective Embodiments]

The control signal explained in respective embodiments may extend over plural frames of, for example, two or more frames, and the same control signal (control pulses) may be superimposed and transmitted repeatedly from the monitor device side. The camera device side detects that the control signal transmitted so as to extend over the plural frames has been transmitted sequentially for prescribed plural frames in a true-false determination circuit to make fixed determination.

A flowchart of FIG. 19 shows a processing example of the above case.

The first half of the flowchart of FIG. 19 shows control signal generation processing in the monitor device and the latter half shows control signal determination processing in the camera device.

Explaining with reference to FIG. 19, first, whether an input of the operation unit is detected or not is determined (Step S101), and when there is some kind of input in the operation unit, the monitor device waits until the vertical synchronization signal of the video signal outputted from the camera device is detected (Step S102). When the vertical synchronization signal is detected and the vertical synchronization period is determined, control pulses having the control contents corresponding to the operation in the vertical synchronization period (vertical blanking interval) are generated repeatedly within the vertical blanking interval of plural frames (Step S103). The frame periods to be repeated are, for example, two-frame periods or three-frame periods. The superimposition of control pulses is performed by current and so on which have been already explained.

Then, the camera device side detects the control pulses superimposed in the vertical blanking interval (Step S104). When control pulses are detected, whether the control pulses are detected repeatedly for a given number of frame periods is determined to perform the true-false determination processing of the control signal (Step S105). For example, in the case where the same control pulse is superimposed sequentially for three-frame periods, whether the pulses have been sequentially detected for three-frame periods is determined. Alternatively, it is also preferable that, when the pulse is superimposed sequentially for three-frame periods, pulses may be only detected for sequential two-frame periods on the camera device side.

Only in the case where the detection of control pulses is determined to be right in the true-false determination, the control unit of the camera device executes control operation shown by corresponding control pulses (Step S106).

FIGS. 20A and 20B show states in which the control pulses are sequentially generated over plural frames.

As shown in FIG. 20A, control pulses shown in FIG. 20B are sequentially generated so as to extend over two vertical synchronization periods.

When plural frame periods are used as the above, the control of the camera device can be performed from the monitor device more positively.

In respective embodiments explained as the above, the technology is applied to a case where the camera device is connected to the monitor device and the camera device is controlled from the monitor device, however, devices other than the monitor device can be used so long as devices receive an analog video signal transmitted from the camera device. The in-vehicle camera is also just an example, and the technology can be applied to camera systems of other applications.

The present disclosure contains subject matter related to that disclosed in Japanese Priority Patent Application JP 2010-191377 filed in the Japan Patent Office on Aug. 27, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing device comprising:
an output unit that outputs a video signal obtained in an imaging unit to a connected cable;
a detection unit that detects a variation in current or voltage of the video signal to be output from the output unit; and
a control unit that determines a control signal transmitted through the connected cable based on the variation of the video signal detected by the detection unit and performs operation control corresponding to the control signal,
wherein the output unit comprises a changeover switch for switching a signal obtained at the connected cable to a line to be supplied to the control unit based on the control signal, and the control unit directly performs communication with the outside through the connected cable by changing over the changeover switch.

2. The signal processing device according to claim 1, wherein the control unit determines the control signal based on the variation in current in a vertical blanking interval of the video signal.

3. The signal processing device according to claim 2, wherein the control unit performs control of applying power to a camera device based on the control signal.

4. The signal processing device according to claim 3, wherein the control unit maintains a power-on state when further detecting the control signal in a given period of time after power application and changes a state from the power-on state to a power-off state when not detecting the control signal in the given period of time.

5. The signal processing device according to claim 1, wherein the detection unit detects the variation in voltage applied to the video signal through a low-pass filter.

6. A signal processing device comprising:
an output unit that outputs a video signal obtained in an imaging unit to a connected cable;
a detection unit that detects a variation in current or voltage of the video signal to be output from the output unit; and
a control unit that determines a control signal transmitted through the connected cable based on the variation detected by the detection unit and performs operation control corresponding to the control signal,
wherein the detection unit detects the same variation of the video signal repeatedly over plural frame periods, and
wherein true-false determination is made by determining the same control signal based on the same variation of the video signal plural times over the plural frame periods.

7. A signal processing device comprising:
an output unit that outputs a video signal obtained in an imaging unit, the video signal including video signal components;
a cancelling unit that cancels the video signal components in the video signal superposed by a control signal for performing operation control of a camera device;
a detection unit that detects a variation in current or voltage of the video signal in which the video signal components are cancelled, to be output from the output unit; and
a control unit that determines the control signal transmitted through a connected cable based on the detected variation of the video signal and performs the operation control corresponding to the control signal,
wherein the output unit comprises a changeover switch for switching a signal obtained at the connected cable to a line to be supplied to the control unit based on the control signal, and the control unit directly performs communication with the outside through the connected cable by changing over the changeover switch.

8. The signal processing device according to claim 7, wherein the control unit determines the control signal based on the variation in current in a vertical blanking interval of the video signal.

9. The signal processing device according to claim 8, wherein the control unit performs control of applying power to the camera device based on the control signal detected from the variation in current in the vertical blanking interval of the video signal.

10. The signal processing device according to claim 9, wherein the control unit maintains a power-on state when further detecting the control signal in a given period of time after power application and changes a state from the power-on state to a power-off state when not detecting the control signal in the given period of time.

11. The signal processing device according to claim 7, wherein the detection unit detects the variation in voltage applied to the video signal through a low-pass filter.

12. The signal processing device according to claim 7, wherein when the control unit receives the control signal for maintaining a power-on state, the power-on state is fixed for the camera device.

13. A camera system comprising:
the camera device comprising the signal processing device according to claim 7; and
a timer which sets a time after which power to the camera device is turned off, in case the control signal is not detected.

14. A camera system comprising:
the camera device comprising the signal processing device according to claim 7;
a monitor device that receives the video signal, and
a synchronization signal detection circuit that detects a horizontal synchronization signal of the video signal received by the monitor device.

15. A signal processing method comprising:
in a camera device:
outputting a video signal obtained in an imaging unit to a connected cable, the video signal including video signal components;
cancelling the video signal components in the video signal superposed by a control signal for performing operation control of the camera device;
detecting a variation in current or voltage of the video signal in which the video signal components are cancelled in the connected cable outputting the video signal from the camera device;
determining the control signal transmitted through the connected cable based on the detected variation of the video signal; and
performing operation control based on the control signal,
wherein a signal obtained at the connected cable is switched to a line to be supplied to a control unit using a changeover switch based on the control signal, and the control unit directly performs communication with the outside through the connected cable by changing over the changeover switch.

16. A signal processing device comprising:
output means for outputting a video signal obtained in an imaging means to a connected cable;
detection means for detecting a variation in current or voltage of the video signal to be output from the output means;
control means for determining a control signal transmitted through the connected cable based on the variation of the video signal detected by the detection means and performs operation control corresponding to the control signal, and
switching means for switching a signal obtained at the connected cable to a line to be supplied to the control means based on the control signal, and the control means directly performs communication with the outside through the connected cable by changing over the switching means.

17. A signal processing method comprising:
detecting a variation in current or voltage of a video signal obtained in an imaging unit, the video signal being output to a connected cable;
determining a control signal transmitted through the connected cable based on the detected variation of the video signal;
performing operation control based on the control signal; and switching connection to a line for supplying the control signal to a control unit based on the control signal,
wherein a signal obtained at the connected cable is switched to a line to be supplied to a control unit by a changeover switch based on the control signal, and the control unit directly performs communication with the outside through the connected cable by changing over the changeover switch.

18. A signal processing device comprising:
an output means for outputting a video signal obtained in an imaging means to a connected cable;
a detection means for detecting a variation in current or voltage of the video signal to be output from the output means; and
a control means for determining a control signal transmitted through the connected cable based on the variation of the video signal detected by the detection means and performing operation control corresponding to the control signal,
wherein the detection means detects the same variation of the video signal repeatedly over plural frame periods, and
wherein true-false determination is made by determining the same control signal based on the same variation of the video signal plural times over the plural frame periods.

19. A signal processing method comprising:
detecting a variation in current or voltage of a video signal obtained in an imaging unit, the video signal being output to a connected cable;
determining a control signal transmitted through the connected cable based on the detected variation of the video signal; and
performing operation control based on the control signal; and
detecting the same variation of the video signal repeatedly over plural frame periods,
wherein true-false determination is made by determining the same control signal based on the same variation of the video signal plural times over the plural frame periods.

20. A signal processing device comprising:
output means for outputting a video signal obtained in an imaging means to a connected cable, the video signal including video signal components;
cancelling means for cancelling the video signal components in the video signal superposed by a control signal for performing operation control of a camera device;
detection means for detecting a variation in current or voltage of the video signal in which the video signal components are cancelled, to be output from the output means; and
control means for determining the control signal transmitted through the connected cable based on the detected variation of the video signal and for performing the operation control corresponding to the control signal,
wherein the output means comprises a changeover switch for switching a signal obtained at the connected cable to a line to be supplied to the control means based on the control signal, and the control means directly performs communication with the outside through the connected cable by changing over the changeover switch.

* * * * *